United States Patent Office 3,422,077
Patented Jan. 14, 1969

3,422,077
PRODUCTION OF HIGH RANKED BLOCKED POLYSULFIDE POLYMERS
Eugene R. Bertozzi, Yardley, Pa., assignor to Thiokol Chemical Corporation, Bristol, Pa., a corporation of Delaware
No Drawing. Continuation of application 620,559, Mar. 3, 1967, which is a continuation of application Ser. No. 302,724, Aug. 16, 1963. This application Aug. 16, 1967, Ser. No. 661,128
U.S. Cl. 260—63    9 Claims
Int. Cl. C08g 25/00

ABSTRACT OF THE DISCLOSURE

This disclosure relates to polysulfide polymers of high sulfur rank which have —SSH terminal groups which are blocked by carbonyl compounds.

---

This application is a continuation of Ser. No. 620,559 filed Mar. 3, 1967 and now abandoned which was a continuation of Ser. No. 302,724 filed Aug. 16, 1963 and now abandoned.

The present invention relates to high sulfur rank, blocked liquid polysulfide polymers, to the process by which they are prepared and to products made therewith.

Conventional, liquid polysulfide polymers and their preparation are disclosed in U.S. 2,466,963. According to the process disclosed therein, the conventional liquid polymers, which have —SH terminals, are formed by "splitting" solid, high molecular weight polysulfide polymers. The solid polymers are formed, generally, by reacting alkaline polysulfides with organic dihalides, i.e., $n\text{Na}_2\text{S}_x + \text{Cl}-\text{R}-\text{Cl} \rightarrow 2n\text{NaCl} + (\text{RS}_x)_n$ wherein R may represent the ethyl formal radical

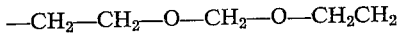

—CH$_2$—CH$_2$—O—CH$_2$—O—CH$_2$CH$_2$ $x$ is the sulfur rank of the alkaline polysulfide and the resulting solid polysulfide polymer and can be varied from 1 to 5, and $n$ is the degree of polymerization and is about 2000 to 4000 for the solid polymers described above.

To improve cold flow resistance and other physical properties of the solid polymers, a small amount, about 0.1 to 2 mols percent, of a crosslinking agent having a halide functionality of 3 or more, such as, trichloropropane, trichloroethane, bis dichloropropyl formal, chlorinated paraffins and $\beta,\beta',\gamma,\gamma'$-tetrachloro normal propyl ether, is incorporated in the solid polymer to obtain branching of the polymer chains. This crosslinking agent joins in the main polymer chain formation through two of its halide groups in a manner similar to the use of the organic dihalide discussed above. As a result, there are one or more chlorine groups remaining unreacted on the resulting polymer chains per crosslinking group which react with the alkaline polysulfide, as disclosed above, to form a branched polymer chain.

To obtain the lower molecular weight, mercaptan terminated liquid polymers the solid polymers are "split," as noted above, with a "splitting agent." The splitting agent acts as a reducing agent to cleave the polysulfide groups, as shown as follows with a solid polymer having a sulfur rank of 2:

—R—SS—R—+NaSH+Na$_2$SO$_3$→
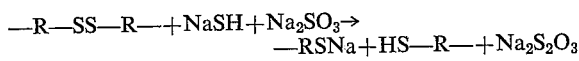
—RSNa+HS—R—+Na$_2$S$_2$O$_3$

A neutralizing coagulating agent such as acetic acid is used to coagulate the resulting liquid polymer suspension and convert the terminal —RSNa groups to terminal —RSH groups. The liquid polymer is then washed, dried, filtered and packaged. It has not been possible to date, as far as the applicant is aware, to form liquid polysulfide polymers, as described above, which have a sulfur rank of higher than 2.0. By having a sulfur rank of no higher than 2.0 it is meant, according to the present invention, that the sulfur linkages joining the recurring hydrocarbon, oxahydrocarbon or thiahydrocarbon radicals in the chain of the liquid polymer contain an average of 2.0 or less sulfur atoms per linkage. In fact, none of the linkages in the conventional liquid polymers will ever contain more than two sulfur atoms and some will contain only one sulfur atom. Although the precursor solid polymer may have a sulfur rank of more than 2.0, the sulfur in excess of rank 2.0, or isosulfur as it is referred to in U.S. 2,466,963, is partially or completely removed or stripped from the solid polymers, as disclosed in U.S. 2,278,128, before the solid polymers are split to liquid polymers, as disclosed in U.S. 2,466,963, and the remaining isosulfur, if any, is removed during the splitting or oxidation operation of U.S. 2,466,963. Solid polymers having a sulfur rank of 2.5 are also disclosed in U.S. 3,053,816. The conventional liquid polymers which have a rank of 2.0 or less, moreover, when cured to a solid elastomer, have limited resistance to certain solvents and require the use of a curing agent to effectuate the cure thereof.

In U.S. 3,331,818 there is disclosed a high sulfur rank, —SSH terminated polysulfide polymer which cures at room temperature without the use of a cure catalyst upon exposure to the atmosphere. These cured polymers are more resistant to solvents such as toluene than the cured conventional liquid polymers. These high sulfur rank polysulfide polymers have a disadvantage, however, in that during the cure thereof they emit noxious hydrogen sulfide fumes. For some applications of these polymers, such as sealant or coating usage in confined quarters, the noxious fumes emitted present a health hazard when large quantities of the polymer are used.

An object of the present invention is to provide a high sulfur rank, liquid polysulfide polymer which does not emit any noxious odors during the cure or storage thereof.

Another object of the present invention is to provide high sulfur rank, liquid polysulfide polymers which are stable, i.e., do not cure, at room temperature even when exposed to the atmosphere.

It has now been found according to the present invention, that the emission of noxious fumes during the cure of high sulfur rank, —SSH terminated polysulfide polymers can be avoided by blocking the —SSH terminals, prior to the cure of the polymers, with an aldehyde or a ketone. The blocking reaction can be conducted either before, after or concurrent with the formation of the high sulfur rank polymers from the conventional liquid polysulfide polymers of U.S. 2,466,963.

The conventional liquid polymers as discussed herein are those polythiopolymercaptan liquid polymers produced, as noted above, as described in U.S. 2,466,963. These polymers have a molecular weight of about 500 to 12,000 and are liquid, i.e., pourable, at room temperature (about 25° C.). Structurally, they may be described as HS(—R—S$_x$)$_n$—R—SH wherein the average of all the $x$'s may be 1.5 to 2.0, $n$ may be about 2 to 70 and R is a hydrocarbon, oxahydrocarbon or thiahydrocarbon radical such as

—C$_2$H$_4$—O—CH$_2$—O—C$_2$H$_4$—C$_4$H$_8$—
O—CH$_2$—O—C$_4$H$_8$— and —C$_4$H$_8$—O—C$_4$H$_8$—. When these polymers are reacted with elemental sulfur to form the high sulfur rank, —SSH terminated polymers, it is believed that the reaction proceeds as follows:

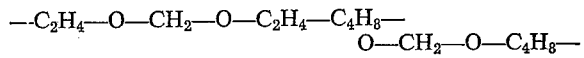
HS(RS$_r$)$_n$RSH + (np+2)S → HSS(RS$_{r+p}$)$_n$RSSH wherein the average of all the $r$'s is 1.5 to 2.0, $p$ is 0.1 to 3.0, $n$ is 2 to 70 and $r+p$ is the desired sulfur rank, $x$, which, for any one linkage, may be 1 to 5 and for the average of all the linkages is about 1.6 to 5.0 and preferably about 2.5 to 4.0. The reaction can be carried out at moderate temperatures of about 20 to 50° C. in an open vessel but preferably under an inert gas such as nitrogen. To obtain polymers having a sulfur rank in excess of about 3.0, however, it is preferably to conduct the reaction in the presence of about 0.5 to 10% by weight of an amine catalyst such as triethylamine, dibutyl amine or n-butyl amine. Triethylamine is the preferred catalyst since it tends to promote the fastest reaction times. The reactions can be accomplished in about 2–12 hours. A small amount of water may also be used with the amine to facilitate the use of the catalyst. It is believed that the water promotes the solubility and dispersion of the amine in the reaction system. Solvents such as dimethylformamide may be used if desired in the more viscous system.

It is believed that the resulting high sulfur rank, —SSH terminated polymer cures on exposure to the atmosphere with the emission of $H_2S$ according to the reaction:

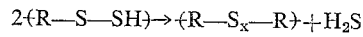

According to the present invention, the blocking of the —SSH terminals is accomplished by reacting the previously described liquid, high sulfur rank, —SSH terminated polysulfide polymer with an aldehyde or ketone in the presence of an amine. It is believed that the aldehyde or ketone reacts with the amine to form an amine hemi-acetal or hemi-ketal terminal with the —SSH group as indicated by the following reaction with an aldehyde:

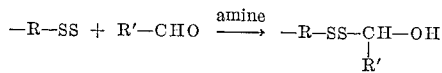

The blocking of the terminal groups, according to the present invention, can be accomplished with the aldehyde or ketone blocking agents, as noted above, either before, after or during the formation of the liquid, high sulfur rank polysulfide polymers from the conventional, liquid polysulfide polymers. The high sulfur rank polymers can thus be blocked after they are formed by reacting the blocking agent therewith in the presence of an amine or they can be blocked concurrently with their formation by adding the blocking agent to a sulfur/amine/conventional liquid polysulfide polymer reaction system. The blocked, high sulfur rank polymers can also be formed by first blocking a conventional, liquid polysulfide polymer with the aldehyde or ketone blocking agent in the presence of an amine and subsequently reacting the blocked conventional liquid polymer with sulfur to form a blocked, high sulfur rank liquid polymer. Slightly more of the amine is usually needed where sulfur is added to a blocked conventional liquid polymer. Where sulfur is added to the blocked, conventional liquid polymer, little or no $H_2S$ evolves. Where sulfur is added to the unblocked polymer, or where sulfur, conventional liquid polymer and blocking agent are reacted simultaneously noticeable amounts of $H_2S$ evolve. It also usually requires longer to add the sulfur to the blocked conventional polymer than it does to the unblocked conventional polymer. No matter how the blocked high sulfur rank polymers are prepared, no external heating is required to promote any of the reactions. The temperature of the reaction systems, however, will climb from room temperature to about 40 to 60° C. due to frictional heat caused by the agitation or stirring of the viscous reaction systems and/or by the exotherm produced by the reactions. The reactions are preferably carried out under an inert atmosphere, such as under a blanket of nitrogen.

The aldehydes which may be used in the blocking reactions include formaldehyde, furfural, and acetaldehyde and they should be present in about 2 to 9% by weight of liquid polymer. The preferred of these aldehydes is formaldehyde.

The ketones which may be used in this blocking reaction include acetone and they should be present in approximately 10% by weight of liquid polymer.

Amine catalysts which can be utilized in the blocking process of the present invention include triethylamine, dibutyl amine and n-butyl amine. The preferred of these catalysts is triethylamine and they should be present in about 0.5 to 10% by weight and preferably about 0.5% by weight of liquid polymer.

The novel, blocked, high sulfur rank liquid polymers of the present invention have a sulfur rank of about 1.6 to 5 and preferably 2.5 to 4.0. These blocked high rank polysulfide polymers can be cured by utilizing conventional polysulfide curing agents such as organic and metallic peroxides. Exemplary cure systems would consist in the use of lead peroxide or lead oxides.

It is believed that the cure mechanism results in the reforming of the polysulfide link when the curing agent oxygen source reacts with the hemi-acetal or hemi-ketal terminal. No $H_2S$ is emitted during the cure of the novel, blocked polymers of the present invention.

The novel high sulfur rank liquid polymers discussed herein can be used to form films, coatings and castings for applications requiring a highly solvent resistant material. The cured polymers of the present invention exhibit a much greater resistance to solvents such as toluene, than is shown by the cured conventional liquid polysulfide polymers.

The high sulfur rank liquid polymers of the present invention can also be used to prepare curable sealants or caulking compositions in combination with the curing agents mentioned above and the fillers, plasticizers, pigments and other adjuvants known to the art. The following examples are merely illustrative of the present invention and are not intended as a limitation upon the scope thereof.

Example 1

A three necked 2.5 liter glass reaction flask was charged with 1000 grams of liquid polysulfide polymer having essentially the formula

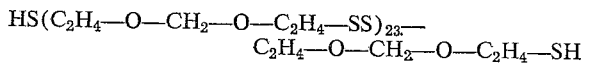

289.5 grams of powdered sulfur, N.F., 45 grams of p-formaldehyde, 1.25 ml. of triethylamine and 2.5 ml. of distilled water. The mixture was reacted with continuous agitation under a nitrogen atmosphere for 10 hours. No external heat was applied; however, the heat produced by the agitation and reaction exotherm caused the temperature to rise to 40–50° C. At the completion of the reaction time, as evidenced by a clearing of the color of the reaction mixture, the product was a blocked, liquid polysulfide polymer having a sulfur rank of 3.5. The viscosity of this liquid polymer was 340 poises.

A portion of this high rank polymer was cured overnight at room temperature using the following formulation:

| | Parts by weight |
|---|---|
| Liquid polymer | 100 |
| Essex SRF #3 (semi-reinforcing furnace black) | 30 |
| Durez 10694 (phenolic adhesion additive) | 5 |
| Curing agent | 15 |

The polymer cured without the emission of $H_2S$. The curing agent had the following formulation:

| | Parts by weight |
|---|---|
| Lead dioxide | 50 |
| Stearic acid | 5 |
| Dibutyl phthalate | 45 |

The cured polymer had the following physical properties:

Hardness—durometer Shore A
   After 3 days _____ 47
   After 6 days _____ 53

Tensile, p.s.i. _____ 297
Elongation, percent _____ 470
Modulus, percent:
200 _____ 165
300 _____ 232

The solvent swell of the polymer prepared and cured as described above, after 24 hours in toluene, was 94% as compared to a solvent swell in toluene of 136% for a conventional liquid polysulfide polymer having a sulfur rank of 2.0 and cured as indicated above.

Example 2

A three necked 10 liter glass reaction flask was charged with 400 grams of liquid polysulfide polymer having essentially the formula

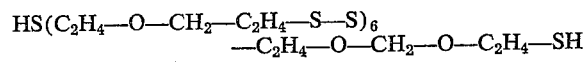
HS($C_2H_4$—O—$CH_2$—$C_2H_4$—S—S)$_6$
—$C_2H_4$—O—$CH_2$—O—$C_2H_4$—SH 1,185 grams of powdered sulfur, N.F., 80 grams of p-formaldehyde, 10 ml. distilled water and 5 ml. of triethylamine. The mixture was reacted, with continuous agitation, under a nitrogen atmosphere for 10 hours. No external heat was applied, however, the heat of friction produced by the continuous agitation and the exothermic nature of the reaction caused the temperature to rise to 40–50° C. At the completion of the reaction time, as evidenced by a clearing of the color of the reaction mixture, the product was a blocked liquid polysulfide polymer having a sulfur rank of 3.5. The viscosity of this liquid polymer was 330 poises.

Two portions of this high rank polymer were cured overnight using the following cure formulations:

| | Parts by weight | |
|---|---|---|
| | 1 | 2 |
| Polymer | 100 | 100 |
| Semi reinforcing furnace black (Essex SRF #3) | | 30 |
| Durez 10694 (phenolic adhesion additive) | 5 | 5 |
| Titanox RA-50 (titanium pigment) | 15 | |
| Witcarb RC (CaCO₃ filler) | 25 | |
| Stearic acid | 1 | |
| Curing agent | 15 | 15 |

No H₂S was emitted during the cure reaction. The curing agent had the following formulation:

Parts by weight
Lead dioxide _____ 50
Stearic acid _____ 5
Dibutyl phthalate _____ 45

The cured samples had the following physical properties:

| | Parts by weight | |
|---|---|---|
| | 1 | 2 |
| Hardness, durometer shore A, after— | | |
| 1 day | 37 | |
| 2 days | 42 | |
| 3 days | 42 | 43 |
| 6 days | | 50 |
| 7 days | 44 | |
| Tensile, p.s.i. | 104 | 168 |
| Elongation, percent | 523 | 556 |
| Modulus, 200% | 56 | 96 |
| Modulus, 300% | 66 | 114 |

The solvent swell after 24 hours in toluene was 112% for cured sample #2, compared to 152% in toluene for the unblocked conventional polymer of 2.0 sulfur rank cured in the same manner.

Example 3

A three necked 500 ml. glass reaction flask was charged with 200 grams of a liquid polysulfide polymer having essentially the formula

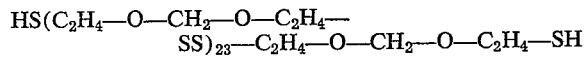
HS($C_2H_4$—O—$CH_2$—O—$C_2H_4$—
SS)$_{23}$—$C_2H_4$—O—$CH_2$—O—$C_2H_4$—SH 50 grams of powdered sulfur, N.F., 0.25 ml. of triethylamine and 0.5 ml. of distilled water. The mixture was reacted for about 5 hours, with continuous agitation and under a nitrogen atmosphere. At the end of this interval 24.0 grams of acetone was added and the reaction continued for 5 additional hours under the above reaction conditions. At no time during the reaction was external heat applied; however, because of the continuous agitation the temperature of the reacting mixture varied from 27–44° C. When cured at room temperature using the lead dioxide curing agent described in Example 1, the blocked high sulfur rank liquid polymer product set up into a solid, solvent resistant elastomer in 5 minutes without the emission of H₂S.

Examples 4–12

In these examples the reactants were charged as indicated in the table below into a 500 ml. glass reaction flask in the following order: liquid polysulfide polymer, powdered sulfur, N.F., triethylamine and distilled water. In Examples 4–8, the liquid polymer was of the type

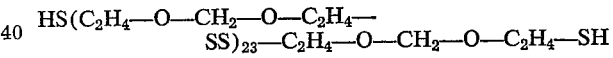
HS($C_2H_4$—O—$CH_2$—O—$C_2H_4$—
SS)$_{23}$—$C_2H_4$—O—$CH_2$—O—$C_2H_4$—SH while, in Examples 9–12, the liquid polymer had essentially the formula

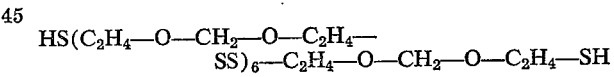
HS($C_2H_4$—O—$CH_2$—O—$C_2H_4$—
SS)$_6$—$C_2H_4$—O—$CH_2$—O—$C_2H_4$—SH The mixture was reacted for about 5 hours with continuous agitation under a nitrogen atmosphere. At the end of this interval the indicated amount of p-formaldehyde was added and the reaction continued under the above conditions for a total period of time as indicated in the table. No external heat was applied at any time during the reaction and the indicated reaction temperature range was caused by the frictional heat produced by the continuous agitation and the exothermic nature of the reaction. The resultant blocked polymers were then cured using the lead dioxide agent described in Example 1. The samples cured to a solid, elastomeric, solvent resistant material in the indicated times without the emission of H₂S.

EXAMPLES 4–12

| No. | Grams of liquid polymer | Grams of sulfur | Amount of triethylamine | Ml. of water | Grams of p-formaldehyde | Hours reacted—Total | Reaction temp. range, °C. | Cure time in min. | Sulfur rank of polymer |
|---|---|---|---|---|---|---|---|---|---|
| 4 | 200 | 50 | 5 grams | 0.5 | 9.0 | 9 | 23–50 | 60 | 3.30 |
| 5 | 200 | 50 | ¼ ml | 0.5 | 18.0 | 16 | 24–57 | 60 | 3.30 |
| 6 | 200 | 50 | 5 grams | 0.5 | 4.5 | 15 | 26–51 | 20 | 3.30 |
| 7 | 200 | 50 | ¼ ml | 0.5 | 9.0 | 15 | 26–37 | 15 | 3.30 |
| 8 | 200 | 50 | ¼ ml | 0.5 | 4.5 | 15 | 23–51 | 20 | 3.30 |
| 9 | 200 | 50 | 10 grams | 0.5 | 18.0 | 16 | 24–38 | 5 | 3.30 |
| 10 | 200 | 50 | ¼ ml | 0.5 | 9.0 | 16 | 24–45 | 60 | 3.30 |
| 11 | 200 | 50 | 5 grams | 0.5 | 4.5 | 15 | 26–39 | 15 | 3.30 |
| 12 | 200 | 50 | ¼ ml | 0.5 | 4.5 | 15 | 23–40 | 20 | 3.30 |

Example 13

The following reactants were charged into a 500 ml. glass reaction flask: 200 grams of a liquid polysulfide polymer having essentially the formula,

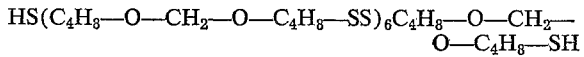

43.2 grams of powdered sulfur, N.F., 0.25 ml. of triethylamnie, and 0.5 ml. of distilled water. The reaction was conducted under a nitrogen atmosphere, wtih continuous agitation, until the sulfur dissolved, which required about four hours. At the end of this reaction time, 9 grams of p-formaldehyde was added to effectuate the blocking mechanism, and the reaction continued for an additional five hours. During the reaction the temperature of the system varied between 40 and 60° C. The resultant blocked polymer which had a sulfur rank of 3.5, was cured in five minutes without the emission of $H_2S$ and using the cure formulation described in Example 1 to a highly solvent-resistant elastomeric material.

Example 14

A high sulfur rank blocked liquid polymer was prepared as outline in Example 13 using 200 grams of liquid polysulfide polymer having essentially the formula $$HS(C_4H_8-O-C_4H_8-SS)_6C_4H_8-O-C_4H_8-SH$$

49.7 grams of sulfur, 0.25 ml. of triethylamine 0.5 ml. of distilled water and later adding 9 grams of p-formaldehyde. The reaction temperature of this system varied between 40–58° C. and the resultant polymer, having a sulfur rank of 3.5, cured as outlined in Example 13 without the emission of $H_2S$.

Example 15

A 500 ml. glass reaction flask was charged with 200 grams of a liquid polysulfide polymer having essentially the formula

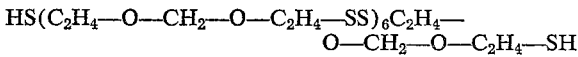

57.9 grams of powdered sulfur, N.F., 20.0 grams of furfural, 0.25 ml. of triethylamine and 0.5 ml. of distilled water. Continuous agitation was applied to the system which was blanketed with nitrogen and the reaction carried out for 10 hours. The temperature of the mixture varied from 40 to 50° C. during the course of the reaction. The resultant, blocked liquid polymer had a sulfur rank of 3.5 and was subsequently cured in one hour at room temperature using the cure formulation outlined in Example 1 without the emission of $H_2S$.

Example 16

The following reactants were charged into a 500 ml. glass reaction flask: 200 grams of a liquid polysulfide polymer having essentially the formula

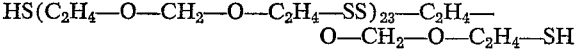

9 grams of p-formaldehyde, 0.25 ml. of triethylamine and 0.5 ml. of distilled water. The materials were agitated under a nitrogen atmosphere for 8 hours with no external heat applied. After this time interval, 50 grams of powdered sulfur, N.F. was added and the reaction continued for 7 hours. Finally, an additional 0.25 ml. of triethylamine was added and the reaction continued for 7 more hours. The total reaction time was 22 hours and the resultant 3.3 sulfur rank liquid polymer cured to a solvent resistant elastomer in one hour at room temperature using the cure formulation described in Example 1 without the emission of $H_2S$.

Example 17

A 500 ml. glass reaction flask was charged, in the order presented, with 200 g. of a liquid polysulfide polymer having essentialy the formula

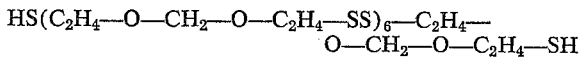

9 grams of p-formaldehyde, 0.25 ml. of triethylamine and 0.5 ml. of distilled water. The mixture was reacted without external heat under a nitrogen atmosphere and with agitation for 8 hours. Fifty grams of powdered sulfur, N.F. was then added to the system and the reaction continued for 7 hours and then 0.25 ml. additional triethylamine added and the reaction time extended for 33 hours to bring the total reaction time to 48 hours. Upon curing, using the formulation outlined in Example 1, the 3.3 sulfur rank liquid polymer product was converted in one hour at room temperature, into a solvent resistant elastomeric material without the emission of $H_2S$.

Example 18

A 500 ml. glass reaction flask was charged, in the order presented, with 200 grams of a liquid polysulfide polymer having essentially the formula

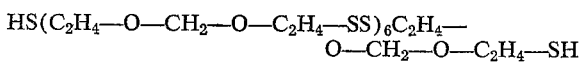

57.9 grams of powdered sulfur, N.F., 7.5 grams of acetaldehyde, 0.25 ml. of triethylamine, and 0.50 ml. of distilled water. The mixture was reacted without the addition of external heat for ten hours, during which time the temperature of the system varied from about 40 to 50° C. The resultant blocked liquid polymer had a sulfur rank of 3.50 and cured to a highly solvent resistant elastomer, using the curing paste described in Example 1, in 30 minutes at room temperature without the emission of $H_2S$.

I claim:

1. A process comprising reacting, with continuous agitation and in the presence of an amine, a liquid polythiopolymercaptan polymer having in its polymeric chain recurring radicals selected from the group consisting of hydrocarbon and oxahydrocarbon radicals linked by linkages selected from the group consisting of —S— and —SS— with elemental sulfur and, as a terminal group supplying reactant, a carbonyl compound selected from the group consisting of aldehydes and ketones to form a liquid high sulfur rank polymer having —SSH terminals which have been blocked with a radical selected from the group consisting of hemi-acetal and hemi-ketal radicals.

2. A process as in claim 1 in which all the reactants are reacted simultaneously.

3. A process as in claim 1 in which the liquid polymer and the sulfur are initially reacted to first produce a high sulfur rank polymer which is then reacted with said carbonyl compound.

4. A process as in claim 1 in which the liquid polymer is initially reacted with the carbonyl compound to produce a blocked, low sulfur rank polymer which is then reacted with said sulfur to form a blocked, high sulfur rank polymer.

5. The product obtained by the process of claim 1.

6. The product obtained by the process of claim 1 wherein the aldehyde is acetaldehyde.

7. The product obtained by the process of claim 1 wherein the aldehyde is formaldehyde.

8. The product obtained by the process of claim 1 wherein the aldehyde is furfural.

9. The product obtained by the process of claim 1 wherein the ketone is acetone.

(References on following page)

References Cited

UNITED STATES PATENTS

| | | | |
|---|---|---|---|
| 2,295,760 | 9/1942 | Schreiber | 260—609 |
| 2,466,963 | 4/1949 | Patrick et al. | 260—79.1 |
| 3,331,818 | 7/1967 | Bertozzi | 260—79.1 |

WILLIAM H. SHORT, *Primary Examiner.*

E. M. WOODBERRY, *Assistant Examiner.*

U.S. Cl. X.R.

260—79.1, 67

UNITED STATES PATENT OFFICE
CERTIFICATE OF CORRECTION

Patent No. 3,422,077                           January 14, 1969

Eugene R. Bertozzi

It is certified that error appears in the above identified patent and that said Letters Patent are hereby corrected as shown below:

Column 2, lines 63 to 64, the formula should read -- $-C_2H_4-O-CH_2-O-C_2H_4-$, $C_4H_8-O-CH_2-O-C_4H_8-$ --. Column 3, line 7, "preferably" should read -- preferable --; lines 32 to 34, the portion of the formula reading "-R-SS" should read -- -R-SSH --. Column 5, line 14, "400" should read -- 4000 --; line 16, the formula should read -- $HS(C_2H_4-O-CH_2-O-C_2H_4-SS)_6$ --; line 54, in the second table, in the heading to the columns numbered 1 and 2, cancel "Parts by weight". Column 7, line 11, "amnie" should read -- amine --; line 26, "outline" should read -- outlined --.

Signed and sealed this 17th day of March 1970.

(SEAL)
Attest:

Edward M. Fletcher, Jr.                     WILLIAM E. SCHUYLER, JR.
Attesting Officer                               Commissioner of Patents